United States Patent
Tchigevsky et al.

(10) Patent No.: US 10,182,446 B2
(45) Date of Patent: Jan. 15, 2019

(54) APPARATUS, SYSTEM AND METHOD OF SELECTING A WIRELESS COMMUNICATION CHANNEL

(71) Applicant: INTEL IP CORPORATION, Santa Clara, CA (US)

(72) Inventors: Izoslav Tchigevsky, Portland, OR (US); Noam Ginsburg, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 196 days.

(21) Appl. No.: 15/109,890

(22) PCT Filed: Feb. 6, 2014

(86) PCT No.: PCT/US2014/015013
§ 371 (c)(1),
(2) Date: Jul. 6, 2016

(87) PCT Pub. No.: WO2015/119603
PCT Pub. Date: Aug. 13, 2015

(65) Prior Publication Data
US 2016/0345336 A1    Nov. 24, 2016

(51) Int. Cl.
*H04W 72/08* (2009.01)
*H04L 29/12* (2006.01)
*H04L 29/08* (2006.01)

(52) U.S. Cl.
CPC ....... *H04W 72/082* (2013.01); *H04L 61/6022* (2013.01); *H04L 67/104* (2013.01)

(58) Field of Classification Search
CPC . H04W 72/082; H04L 67/104; H04L 61/6022
See application file for complete search history.

(56) References Cited

U.S. PATENT DOCUMENTS

| 6,665,269 B1 * | 12/2003 | Schmitz | ............... H04W 24/00 370/251 |
| 2004/0185887 A1 * | 9/2004 | Wolman | .................. H04L 29/06 455/516 |

(Continued)

FOREIGN PATENT DOCUMENTS

| CN | 1622548 | 6/2005 |
| CN | 102369774 | 3/2012 |

(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Lakeram Jangbahadur
(74) *Attorney, Agent, or Firm* — Shichrur & Co.

(57) ABSTRACT

Some demonstrative embodiments include apparatuses, systems and/or methods of selecting a wireless communication channel to communicate in a wireless communication network. For example, an apparatus may include a channel selector to select at a network controller of a first wireless communication network a first wireless communication channel to communicate between the network controller and one or more wireless communication devices, to detect on the first wireless communication channel a frame from a second wireless communication network, and based on a medium access control (MAC) address of the frame, to select between remaining on the first wireless communication channel and selecting a second wireless communication channel to communicate between the network controller and the one or more wireless communication devices.

21 Claims, 5 Drawing Sheets

(56) References Cited

U.S. PATENT DOCUMENTS

| | | | | |
|---|---|---|---|---|
| 2007/0091813 A1* | 4/2007 | Richard | ............. | H04W 72/085 |
| | | | | 370/248 |
| 2008/0058031 A1 | 3/2008 | Deprun | | |
| 2010/0165961 A1 | 7/2010 | Rosario et al. | | |
| 2011/0069636 A1 | 3/2011 | Shao et al. | | |
| 2014/0334287 A1* | 11/2014 | Chen | .................... | H04W 24/04 |
| | | | | 370/216 |

FOREIGN PATENT DOCUMENTS

| | | |
|---|---|---|
| CN | 103259876 | 8/2013 |
| KR | 1020070060153 | 6/2007 |
| WO | 2013035999 | 3/2013 |

OTHER PUBLICATIONS

Wi-Fi Alliance Technical Committee P2P Task Group; Wi-Fi Peer-to-Peer (P2P) Technical Specification; Version 1.2; Dec. 14, 2011; 160 pages.

International Search Report and Written Opinion for PCT/US2014/015013, dated Oct. 29, 2014, 8 pages.

Office Action for Korean Patent Application No. 2016-7017950, dated Jul. 18, 2017, 6 pages (Including 3 pages of English translation).

International Preliminary Report on Patentability for PCT/US2014/015013, dated Aug. 18, 2016, 7 pages.

* cited by examiner

APPARATUS, SYSTEM AND METHOD OF SELECTING A WIRELESS COMMUNICATION CHANNEL

TECHNICAL FIELD

Some demonstrative embodiments relate to an apparatus, system and method of selecting a wireless communication channel.

BACKGROUND

An Access Point (AP) may provide to one or more wireless communication devices access to a communication network, for example, via a Wireless Fidelity (WiFi) communication network.

The AP may select a wireless communication channel of the WiFi communication network to communicate with the one or more wireless communication devices.

Some APs implement an "automatic channel selection" (ACS) mechanism to select the wireless communication channel. According to the ACS mechanism, the AP may continuously monitor the WiFi communication network, and select from a plurality of wireless communication channels a first channel, which has a reduced load compared to the load of other wireless communication channels.

The AP may switch to a second wireless communication channel, for example, when the second wireless communication channel has a reduced load compared to the load of the first wireless communication channel.

As a result of the AP switching to the second wireless communication channel, the one or more wireless communication devices of the network may also switch to the second wireless communication channel.

Performing a large number of switches between wireless communication channels may increase latency and/or overhead.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
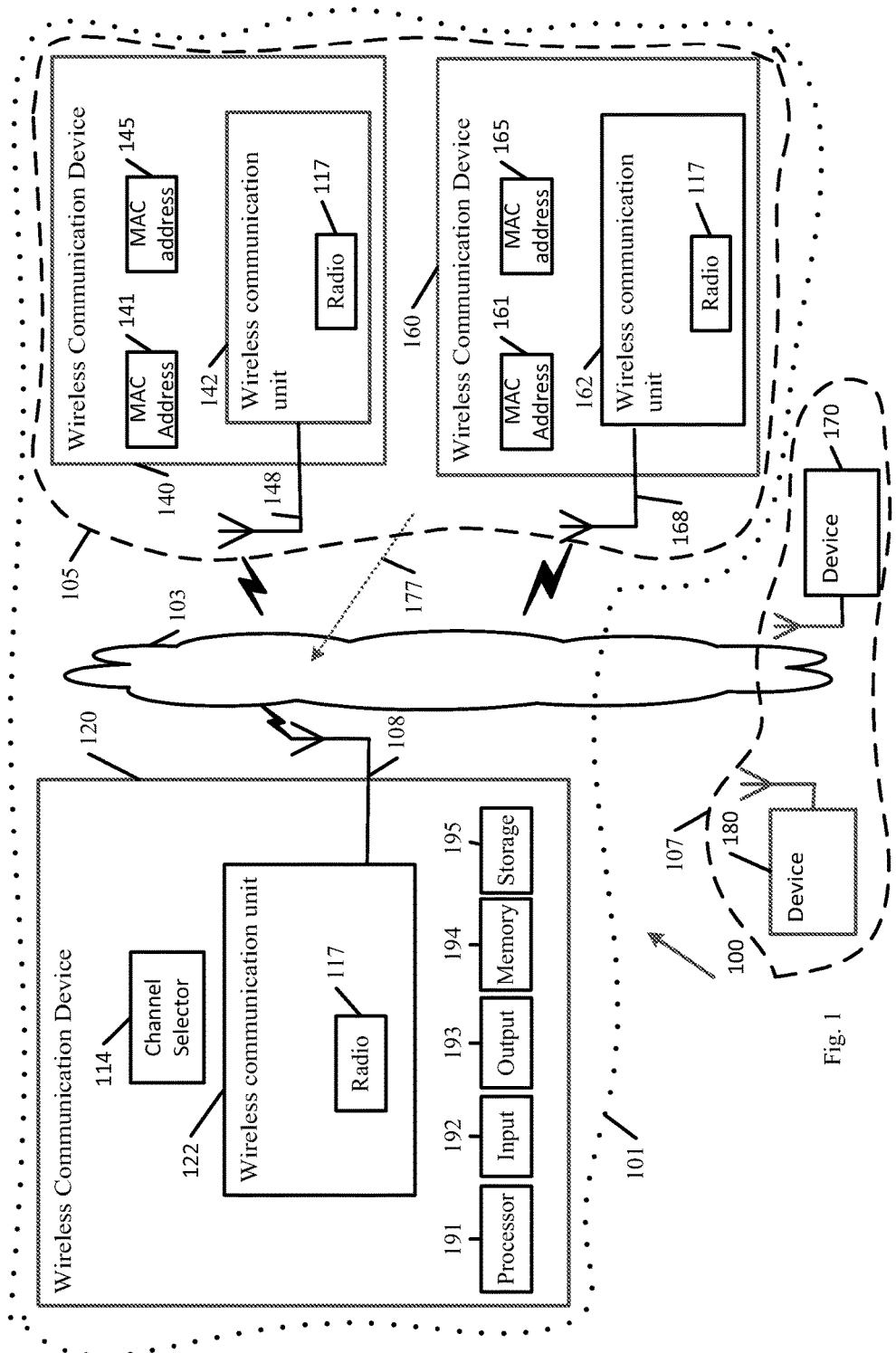
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; *IEEE*802.11 *task group ac* (*TGac*) ("*IEEE*802.11-09/0308r12 —*TGac Channel Model*

Addendum Document"); IEEE 802.11 *task group ad* (*TGad*) (*IEEE P802.11ad-2012, IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: Enhancements for Very High Throughput in the 60 *GHz Band, 28 Dec.,* 2012)) and/or future versions and/or derivatives thereof, devices and/or networks operating in accordance with existing and/or Wireless Fidelity (WiFi) Alliance (WFA) Peer-to-Peer (P2P) specifications (*WiFi P2P technical specification, version* 1.2, 2012) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Frame Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 GHz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The phrase "Peer-to-peer" (P2P) network, as used herein, may relate to a network in which a STA in the network can operate as a client or as a server for another STA in the network. The P2P network may allow shared access to resources, e.g., without a need for a central server.

The phrase "P2P device", as used herein, may relate to a WFA P2P device that may be capable of acting as both a P2P Group Owner and a P2P Client.

The phrase "P2P Client", as used herein, may relate to a P2P device that may be connected to a P2P Group Owner.

The phrase "P2P Group owner", as used herein, may relate to an "AP-like" entity, when referring to non-DMG networks, or to a PCP, when referring to DMG networks that may provide and use connectivity between clients.

The phrase "P2P Group", as used herein, may relate to a set of devices including one P2P Group Owner and zero or more P2P Clients.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices, e.g., including wireless communication devices 120, 140, 160, 170 and/or 180, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 120, 140, 160, 170 and/or 180 may include, for example, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a wireless display, a wireless storage, a music player, or the like.

In some demonstrative embodiments, wireless communication devices 120, 140, 160, 170 and/or 180 may include wireless communication units to perform wireless communication between wireless communication devices 120, 140, 160, 170 and/or 180 and/or with one or more other wireless communication devices. For example, wireless communication device 120 may include wireless communication unit 122, wireless communication device 140 may include a wireless communication unit 142, and/or wireless communication device 160 may include a wireless communication unit 162.

In some demonstrative embodiments, the wireless communication units may include one or more radios. For example, wireless communication units 122, 142 and/or 162 may include a radio 117, e.g., including one or more wireless transmitters, receivers and/or transceivers able to send and/or receive wireless communication signals, RF signals, frames, blocks, transmission streams, frames, messages, data items, and/or data. In one example, the radios may include modulation elements, demodulation elements, amplifiers, analog to digital and digital to analog converters, filters, and/or the like. For example, wireless communication units 122, 142 and/or 162 may include or may be implemented as part of a wireless Network Interface Card (NIC), and the like.

In some demonstrative embodiments, the wireless communication units may include, or may be associated with, one or more antennas. For example, wireless communicate unit 122 may be associated with one or more antennas 108, wireless communicate unit 142 may be associated with one or more antennas 148 and/or wireless communicate unit 162 may be associated with one or more antennas 168.

Antennas 108, 148 and/or 168 may include any type of antennas suitable for transmitting and/or receiving wireless communication signals, blocks, frames, transmission streams, frames, messages and/or data. For example, antennas 108, 148 and/or 168 may include any suitable configuration, structure and/or arrangement of one or more antenna elements, components, units, assemblies and/or arrays. Antennas 108, 148 and/or 168 may include, for example, antennas suitable for directional communication, e.g., using beamforming techniques. For example, antennas 108, 148 and/or 168 may include a phased array antenna, a multiple element antenna, a set of switched beam antennas, and/or the like. In some embodiments, antennas 108, 148 and/or 168 may implement transmit and receive functionalities using separate transmit and receive antenna elements. In some embodiments, antennas 108, 148 and/or 168 may implement transmit and receive functionalities using common and/or integrated transmit/receive elements.

In some demonstrative embodiments, wireless communication devices 120, 140, 160, 170 and/or 180 may also include, for example, a processor 191, an input unit 192, an output unit 193, a memory unit 194, and a storage unit 195. Wireless communication devices 120, 140, 160, 170 and/or 180 may optionally include other suitable hardware components and/or software components. In some demonstrative embodiments, some or all of the components of wireless communication devices 120, 140, 160, 170 and/or 180 may be enclosed in a common housing or packaging, and may be interconnected or operably associated using one or more wired or wireless links. In other embodiments, components of wireless communication devices 120, 140, 160, 170 and/or 180 may be distributed among multiple or separate devices.

Processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of device 120 and/or of one or more suitable applications.

Memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by device 120.

Input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, system 100 may include a first wireless communication network 101.

In some demonstrative embodiments, wireless communication network 101 may include, for example, a WiFi communication network.

In some demonstrative embodiments, wireless communication devices 120, 140 and 160 may form, or may be part of, wireless communication network 101.

In some demonstrative embodiments, wireless communication network 101 may include a network controller and one or more wireless communication devices, e.g., client devices. For example, device 120 may perform the functionality of the network controller, and/or device 140 and/or device 160 may perform the functionality of the client devices.

In some demonstrative embodiments, wireless communication network 101 may include an AP and one or more STAs. For example, device 120 may perform the functionality of the AP, and/or device 140 and/or device 160 may perform the functionality of the STAs.

In one example, device 120 may form wireless communication network 101 over WM 103, for example, to enable access of device 140 and/or device 160 to one or more network resources, e.g., the Internet, a network printer, a file server and/or the like.

In some demonstrative embodiments, system 100 may include one or more second wireless communication networks.

In some demonstrative embodiments, the second wireless communication networks may include P2P networks.

In some demonstrative embodiments, wireless communication devices 140 and 160 may form, or may be part of, a second wireless communication network 105, e.g., a P2P network.

In some demonstrative embodiments, wireless communication devices 170 and 180 may form, or may be part of, a third wireless communication network 107, e.g., a P2P network.

In some demonstrative embodiments, wireless communication network 105 may include a group owner (GO) and one or more P2P client devices. For example, device 140 may perform the functionality of the GO and/or device 160 may perform the functionality of the P2P client device.

In some demonstrative embodiments, wireless communication network 105 may include one or more WiFi direct devices. For example, devices 140 and 160 may perform the functionality of WiFi direct devices.

In one example, device 120 may include a router, device 140 may include a Smartphone and/or device 160 may include a wireless display. According to this example, device 140 may communicate with device 120 via wireless communication network 101, for example, to access the Internet, and/or device 140 may communicate with device 160 via wireless P2P network 105, for example, to enable displaying video from the Smartphone on the wireless display.

In some demonstrative embodiments, device 120 may select an operational wireless communication channel to communicate over wireless communication network 101 with devices of wireless communication network 101. For example, device 120 may communicate with device 140 and/or with device 160 via the operational wireless communication channel.

In some demonstrative embodiments, device 120 may select the operational wireless communication channel from a plurality of wireless communication channels. For example, device 120 may select the operational wireless communication channel from a plurality of predefined WiFi communication channels, e.g., WiFi channels 1, 6, 11 and 14.

In some demonstrative embodiments, device 120 may select the operational wireless communication channel based on a load of the plurality of wireless communication channels. For example, the operational wireless communication channel may include a least loaded channel of the plurality of wireless communication channels.

In some demonstrative embodiments, device 120 may select the operational channel to communicate over wireless communication network 101 according to an "automatic channel selection/switch" (ACS) mechanism. For example, device 120 may continuously monitor the load on each channel of the plurality of wireless communication channels, and may select the least loaded channel according to the monitored load on each channel.

In some demonstrative embodiments, device 120 may select a first wireless communication channel, for example, if a first load on the first channel is lesser than a load on other wireless communication channels.

In some demonstrative embodiments, a device communicating with device 120 over the first wireless communication channel in wireless communication network 101 may communicate in an other wireless communication network over the first wireless communication channel. For example, the device may select to use the first wireless communication channel, e.g., to avoid switching between channels when switching between wireless communication network 101 and the other wireless communication network. For example, remaining on the same channel when switching between wireless communication networks may reduce overhead and/or latency.

In some demonstrative embodiments, devices 140 and 160 may communicate over wireless communication network 105 via the first wireless communication channel set by device 120 in wireless communication network 101.

In some demonstrative embodiments, devices 140 and 160 may communicate over wireless communication network 105 via the first wireless communication channel, for example, to enable devices 140 and 160 to avoid switching between channels, for example, when communicating with device 120 over wireless communication network 101 via the first wireless communication channel.

In some demonstrative embodiments, device 120 may detect the communication between device 140 and device 160 on the first wireless communication channel as interference and/or as a load on the first wireless communication channel. As a result, device 120 may switch to a second wireless communication channel, which is less loaded than the first wireless communication channel, e.g., according to the ACS mechanism.

Switching to the second wireless communication channel, as a result of the communication between devices 140 and 160 in wireless communication network 105, may cause devices 140 and 160 to switch to the second wireless communication channel to communicate over wireless communication network 105.

Accordingly, additional switches, e.g., by device 120, to other wireless communication channels may cause devices 120 and 140 to switch to the other wireless communication channels as well.

Therefore, the following of devices 140 and 160 after the channel switches of device 120 may cause multiple unnecessary channel switches and/or may result in connectivity and/or stability issues.

For example, devices 140 and 160 may switch to the second wireless communication channel to communicate over wireless communication network 105. According to this example, device 120 may detect interference and/or load in wireless communication network 101 on the second wireless communication channel resulting from the communication of devices 140 and 160. As a result, device 120 may switch again to an other wireless communication channel, and devices 140 and 160 may follow device 120 to the other wireless communication channel. Accordingly, device 120 may switch again and again to other wireless communication channels, for example, if devices 140 and 160 switch to the same operational channel as device 120, and device 120 identifies the communication between devices 140 and 160 as load and/or interference on the other channel.

Some demonstrative embodiments may enable device 120 to identify when interference on the operational channel is caused by one or more of the devices communicating with device 120 over wireless communication network 101.

Some demonstrative embodiments may enable device 120 to select not to switch to another operational channel when interference on the operational channel is caused by one or more of the devices communicating with device 120 over wireless communication network 101, e.g., as described below.

In some demonstrative embodiments, device 120 may include a channel selector 114 to select the first wireless communication channel to communicate between device 120 and the devices communicating with device 120 over wireless communication network 101.

In some demonstrative embodiments, channel selector 114 may monitor a load on the first wireless communication channel.

In some demonstrative embodiments, channel selector 114 may detect on the first wireless communication channel a frame 177 from another wireless communication network, e.g., wireless communication network 105. For example, frame 177 may include a frame transmitted via the first wireless communication channel from device 140 to device 160 over wireless communication network 105.

In some demonstrative embodiments, frame 177 may include a P2P frame transmitted between a first WiFi direct device and a second WiFi direct device, e.g., between devices 140 and 160.

In one example, device 140 may include a Smartphone and device 160 may include a wireless display. According to this example, frame 177 may include a frame transmitted from the Smartphone to the wireless display over wireless communication network 105. Frame 177 may include, for example, video from the Smartphone to be displayed on the wireless display.

In some demonstrative embodiments, channel selector 114 may remain on the first wireless communication channel, for example, if frame 177 is from a device of the one or more devices communicating with device 120 over wireless communication network 101, e.g., as described below.

In some demonstrative embodiments, channel selector 114 may select to remain on the first wireless communication channel by disabling the ACS mechanism.

In some demonstrative embodiments, channel selector 114 may select a second wireless communication channel to communicate between device 120 and the one or more devices communicating with device 120 over wireless communication network 101, for example, if frame 177 is not from any of the devices communicating with device 120 over wireless communication network 101, e.g., as described below.

In some demonstrative embodiments, channel selector 114 may select the second wireless communication channel using the ACS mechanism.

In some demonstrative embodiments, devices 140 and/or 160 may use a first MAC address to identify devices 140 and/or 160 in wireless communication network 105 and a second MAC address to identify devices 140 and/or 160 in wireless communication network 101. For example, device 140 may use a first MAC address 141 to identify device 140 in wireless communication network 101 and/or a second MAC address 145 to identify device 140 in wireless communication network 105; and/or device 160 may use a first MAC address 161 to identify device 160 in wireless communication network 101 and/or a second MAC address 165 to identify device 160 in wireless communication network 105.

In some demonstrative embodiments, channel selector 114 may select between remaining on the first wireless communication channel and selecting the second wireless communication channel, based on a MAC address of frame 177.

In some demonstrative embodiments, channel selector 114 may retrieve the MAC address of frame 177 from a P2P information element (IE) of frame 177.

In some demonstrative embodiments, the MAC address of frame 177 may include a MAC address of a device ("the transmitter of frame 177"), which transmits frame 177, in wireless communication network 105. For example, the MAC address of frame 177 may include MAC address 145, for example, if device 140 transmits frame 177; or the MAC address of frame 177 may include MAC address 165, for example, if device 140 transmits frame 177.

In some demonstrative embodiments, channel selector 114 may select to remain on the first wireless communication channel, if the transmitter of frame 177 is a device of the one or more devices communicating with device 120 over wireless communication network 101.

In some demonstrative embodiments, channel selector 114 may select to remain on the first wireless communication channel, if the MAC address of frame 177 is to identify in wireless communication network 105 the device of the one or more devices communicating with device 120 over wireless communication network 101.

In some demonstrative embodiments, channel selector 114 may determine if the MAC address of frame 177 identifies in wireless communication network 105 a device of the one or more devices communicating with device 120 over wireless communication network 101, based on a comparison between the MAC address of frame 177 and a MAC address of the device.

In some demonstrative embodiments, channel selector 114 may determine that the MAC address of frame 177 identifies in wireless communication network 105 a device of the one or more devices communicating with device 120 over wireless communication network 101, for example, if the MAC address of frame 177 has a predefined relationship with the MAC address of the device, e.g., as described below.

In some demonstrative embodiments, devices 140 and/or 160 may assign MAC addresses 145 and 165 such that MAC addresses 145 and/or 165 have a predefined relationship with MAC addresses 141 and/or 161, respectively.

In one example, device 140 may assign MAC address 145, such that MAC address 145 is a result of a mathematical function on MAC address 141.

In another example, device 160 may assign MAC address 165, such that MAC address 161 and MAC address 165 include immediately successive MAC addresses.

In some demonstrative embodiments, channel selector 114 may compare the MAC address of frame 177 and a MAC address of the one or more devices communicating with device 120 over wireless communication network 101, e.g., MAC address 141 and/or MAC address 161.

In some demonstrative embodiments, channel selector 114 may determine that the MAC address of frame 177 identifies in wireless communication network 105 a device of the one or more devices communicating with device 120 over wireless communication network 101, for example, if the MAC address of frame 177 has a predefined relationship with MAC address 141 or MAC address 161.

In some demonstrative embodiments, channel selector 114 may select to remain on the first wireless communication channel, if the MAC address of frame 177 has a predefined relationship with the MAC address of device 140 or device 160 in wireless communication network 101, e.g., MAC address 141 or MAC address 161.

In one example, device 140 may transmit frame 177 to device 160 via wireless communication network 105, and channel selector 114 may detect frame 177 in wireless communication network 101. According to this example, channel selector 114 may select to remain on the first wireless communication channel, if the MAC address of frame 177 has a predefined relationship with MAC address 141.

In some demonstrative embodiments, channel selector 114 may select to remain on the first wireless communication channel, if the MAC address of frame 177 and the MAC address of device 140 or device 160 in wireless communication network 101 include immediately successive MAC addresses.

In one example, device 140 may transmit frame 177 to device 160 via wireless communication network 105, and channel selector 114 may detect frame 177 in wireless communication network 101. The MAC address of frame 177 may include an address of 1A-12-6B-74, and MAC address 141 may include an address of 1A-12-6B-75. According to this example, channel selector 114 may select to remain on the first wireless communication channel, for example, since MAC address 141 and the MAC address of frame 177 are immediately successive.

In some demonstrative embodiments, channel selector 114 may select to remain on the first wireless communication channel, based on detecting any other relationship between the MAC address of frame 177 and the MAC address of device 140 or device 160 in wireless communication network 101.

In some demonstrative embodiments, channel selector 114 may select the second wireless communication channel to communicate between device 120 and the one or more devices communicating with device 120 over wireless communication network 101, if the MAC address of frame 177 does not identify any device of the one or more devices communicating with device 120 over wireless communication network 101.

In one example, frame 177 may include a frame ("the interference frame") transmitted from device 170 to device 180 in wireless communication network 107 over the first wireless communication channel. According to this example, channel selector 114 may detect the interference frame on the first wireless communication channel. The MAC address of the interference frame may include a MAC address of device 170. Channel selector 114 may select the second wireless communication channel, for example, since the MAC address of frame 177 does not identify any device of the one or more devices communicating with device 120 over wireless communication network 101.

In some demonstrative embodiments, MAC address 141 may not have a predefined relationship with MAC address 145, and/or MAC address 161 may not have a predefined relationship with MAC address 165. Accordingly, channel selector 114 may not be able to determine that the MAC address of frame 177 identifies in wireless communication network 105 a device of the one or more devices communicating with device 120 over wireless communication network 101, for example, based on a comparison between the MAC address of frame 177 and MAC addresses 141 and 161.

In some demonstrative embodiments, channel selector 114 may receive MAC address information from the one or more devices communicating with device 120 over wireless communication network 101.

In some demonstrative embodiments, channel selector 114 may utilize the MAC address information to identify that the MAC address of frame 177 identifies in wireless communication network 105 a device of the one or more devices communicating with device 120 over wireless communication network 101.

In some demonstrative embodiments, channel selector 114 may receive the MAC address information in a management frame from the one or more devices communicating with device 120.

In some demonstrative embodiments, channel selector 114 may receive from a device of the one or more devices communicating with device 120 over wireless communication network 101 a management frame including an address field and an information element (IE), e.g., as described below with reference to FIG. 4.

In some demonstrative embodiments, the IE may include a first MAC address of the device in wireless communication network 101, and the address field may include a second MAC address of the device in wireless communication network 105.

In one example, channel selector 114 may receive a management frame from device 140. According to this example, the IE of the management frame may include MAC address 141 and the address field of the management frame may include MAC address 145.

In another example, channel selector 114 may receive a management frame from device 160. According to this example, the IE of the management frame may include MAC address 161 and the address field of the management frame may include MAC address 165.

In some demonstrative embodiments, channel selector 114 may compare the MAC address of frame 177 to a MAC address of the one or more devices communicating with device 120 over wireless communication network 101, based on the information in the management frame. For example, channel selector 114 may compare the MAC address of frame 177 to the MAC address in the address field of a management frame received from a device of the one or more devices communicating with device 120 over wireless communication network 101.

In some demonstrative embodiments, channel selector 114 may remain on the first wireless communication channel, if the MAC address of frame 177 matches the MAC address of device 140 or 160 in wireless communication network 105. For example, channel selector 114 may remain on the first wireless communication channel, if the MAC address of frame 177 matches MAC address 145 of device 140 in wireless communication network 105; or if the MAC address of frame 177 matches MAC address 165 of device 160 in wireless communication network 105.

In some demonstrative embodiments, the management frame may include a beacon transmitted from device 140 or 160 in wireless communication network 105. For example, the management frame may include a P2P beacon transmitted from device 140.

In one example, device 140 may transmit a P2P beacon via wireless communication network 105. The P2P beacon may include MAC address 145 in an address field of the P2P beacon and MAC address 141 in an IE of the P2P beacon. According to this example, channel selector 114 may identify that MAC address 145 belongs to device 140, e.g., based on MAC address 141, and channel selector 114 may remain on the first wireless communication channel, if the MAC address of frame 177 matches MAC address 145.

In some demonstrative embodiments, a device of the one or more devices communicating with device 120 over wireless communication network 101 may not be configured to send beacons. For example, device 160 may not be configured to send beacons, for example, if device 160 performs the functionality of a WiFi direct client, e.g., a P2P client.

In some demonstrative embodiments, channel selector 114 may trigger device 160 to transmit the management frame including the MAC address of device 160 in wireless communication network 105.

In some demonstrative embodiments, channel selector 114 may identify that the MAC address of frame 177 identifies device 160 in wireless communication network 105, based on the management frame received from device 160.

In some demonstrative embodiments, device 120 may transmit a probe request to device 160.

In some demonstrative embodiments, the probe request may include a P2P scan probe request.

In some demonstrative embodiments, device 160 may receive the probe request from device 120, and may transmit a probe response to device 120, in response to the probe request.

In some demonstrative embodiments, the probe response may include a P2P probe response transmitted via wireless communication network 105.

In some demonstrative embodiments, the probe response may include the IE and the address field including MAC address 165.

In some demonstrative embodiments, channel selector 114 may remain on the first wireless communication channel, if the MAC address of frame 177 matches the MAC address in the address field of the probe response from device 160.

In one example, device 120 may transmit a P2P probe request to device 160. Device 160 may receive the P2P probe request and may transmit to device 120 a P2P probe response, e.g., in response to the probe request. The P2P probe response may include an address field including MAC address 165, and an IE including MAC address 161. According to this example, channel selector 114 may identify that MAC address 165 belongs to device 160, e.g., based on MAC address 161, and may remain on the first wireless communication channel, if the MAC address of frame 177 matches MAC address 165.

In some demonstrative embodiments, remaining on the first wireless communication channel, for example, if frame 177 is transmitted from a device of the one or more devices communicating with device 120 over wireless communication network 101, and switching to the second wireless communication channel, for example, only if frame 177 is transmitted from a device other than the one or more devices communicating with device 120 over wireless communication network 101, may enable devices 120, 140 and/or 160 to avoid unnecessary channel switches, which may increase latency and/or overhead of communication between devices 120, 140 and/or 160.

Figure 2:
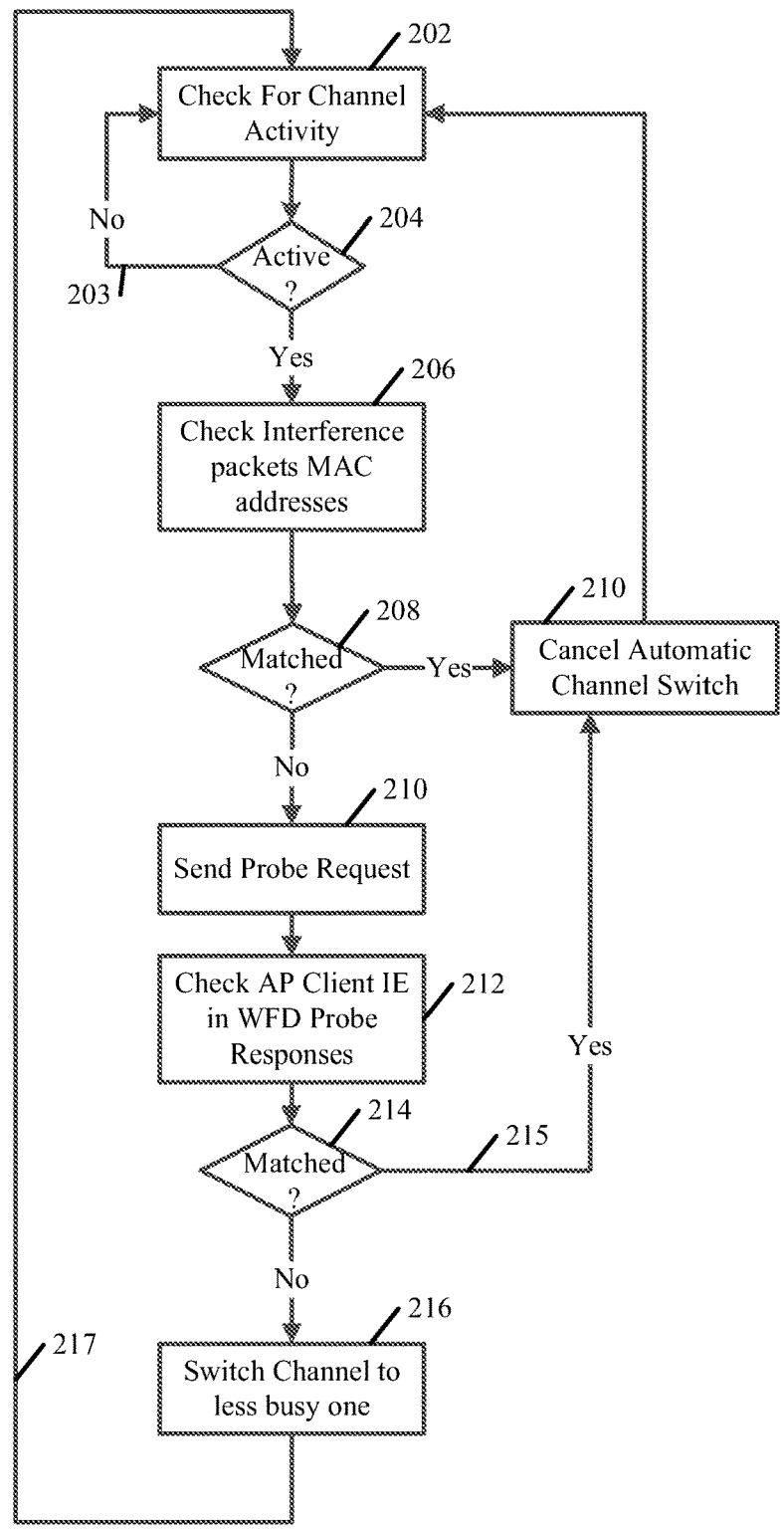
FIG. 2 is a schematic flow-chart illustration of a method of automatic channel selection, in accordance with some demonstrative embodiments.

Reference is made to FIG. 2, which schematically illustrates a method of automatic channel switching, in accordance with some demonstrative embodiments. In some demonstrative embodiments, one or more of the operations of the method of FIG. 2 may be performed by one or more elements of a system, e.g., system 100 (FIG. 1), a wireless communication device, e.g., wireless communication device 120 (FIG. 1), and/or a channel selector, e.g., channel selector 114 (FIG. 1).

As indicated at block 202, the method may include checking at a network controller for an interference frame on a wireless communication channel of a wireless communication network controlled by the network controller. For example, channel selector 114 (FIG. 1) may monitor the first wireless communication channel, e.g., as described above.

As indicated at block 204, the method may include determining whether or not an interference frame is detected on the channel. For example, channel selector 114 (FIG. 1) may determine if an interference frame is detected on the first wireless communication channel, e.g., as described above.

As indicated by arrow 203, the method may include continuing to monitor the channel for an interference frame. For example, channel selector 114 (FIG. 1) may continue to monitor the first wireless communication channel.

As indicated at block 206, the method may include checking a MAC address of an interference frame, for example, if an interference frame is detected. For example, channel selector 114 (FIG. 1) may check the MAC address of frame 177 (FIG. 1), for example, if channel selector 114 (FIG. 1) detects frame 177 (FIG. 1) from wireless communication network 105 (FIG. 1), e.g., as described above.

As indicated at block 208, the method may include determining whether or not the MAC address of the interference frame matches a MAC address of one or more devices communicating with the network controller. For example, channel selector 114 (FIG. 1) may determine whether or not the MAC address of frame 177 (FIG. 1) matches MAC address 145 or MAC address 165 (FIG. 1), e.g., as described above.

As indicated at block 208, the method may include canceling the automatic channel switch mechanism, for example, if the MAC address of the interference frame matches the MAC address of a device of the one or more devices communicating with the network controller. For example, channel selector 114 (FIG. 1) may cancel the ACS mechanism, if the MAC address of frame 177 (FIG. 1) matches MAC address 145 or MAC address 165 (FIG. 1), e.g., as described above.

As indicated at block 210, the method may include sending a probe request, for example, if the MAC address of the interference frame does not match MAC address of any of the one or more devices communicating with the network controller. For example, channel selector 114 (FIG. 1) may send the probe request, for example, if the MAC address of frame 177 (FIG. 1) does not match the MAC address of device 140 or device 160 (FIG. 1), e.g., as described above.

As indicated at block 212, the method may include checking the MAC address in an IE of the probe response. For example, channel selector 114 (FIG. 1) may check MAC address 161 (FIG. 1) in the IE of the probe response received from device 160 (FIG. 1), e.g., as described above.

As indicated at block 214, the method may include determining whether or not the MAC address in the probe response matches the MAC address of frame 177. For example, channel selector 114 (FIG. 1) may determine whether or not the MAC address of frame 177 (FIG. 1) matches the MAC address in the address field of the probe response, e.g., as described above.

As indicated by arrow 215, the method may include canceling the automatic channel switch mechanism, for example, if the MAC address in the probe response matches the MAC address of frame 177. For example, channel selector 114 (FIG. 1) may cancel the ACS mechanism if the MAC address 165 (FIG. 1) in the address field of the probe response matches the MAC address of frame 177 (FIG. 1), e.g., as described above.

As indicated at block 216, the method may include switching to a less busy channel, for example, if the MAC address in the probe response does not match the MAC address of frame 177. For example, channel selector 114 (FIG. 1) may switch to the second wireless communication channel, for example, if the MAC address in the probe response includes the MAC address of device 170 (FIG. 1), e.g., as described above.

As indicated by arrow 217, the method may include monitoring the less busy channel activity, for example, after switching to the less busy channel. For example, channel selector 114 (FIG. 1) may continue to monitor the second wireless communication channel.

Figure 3:
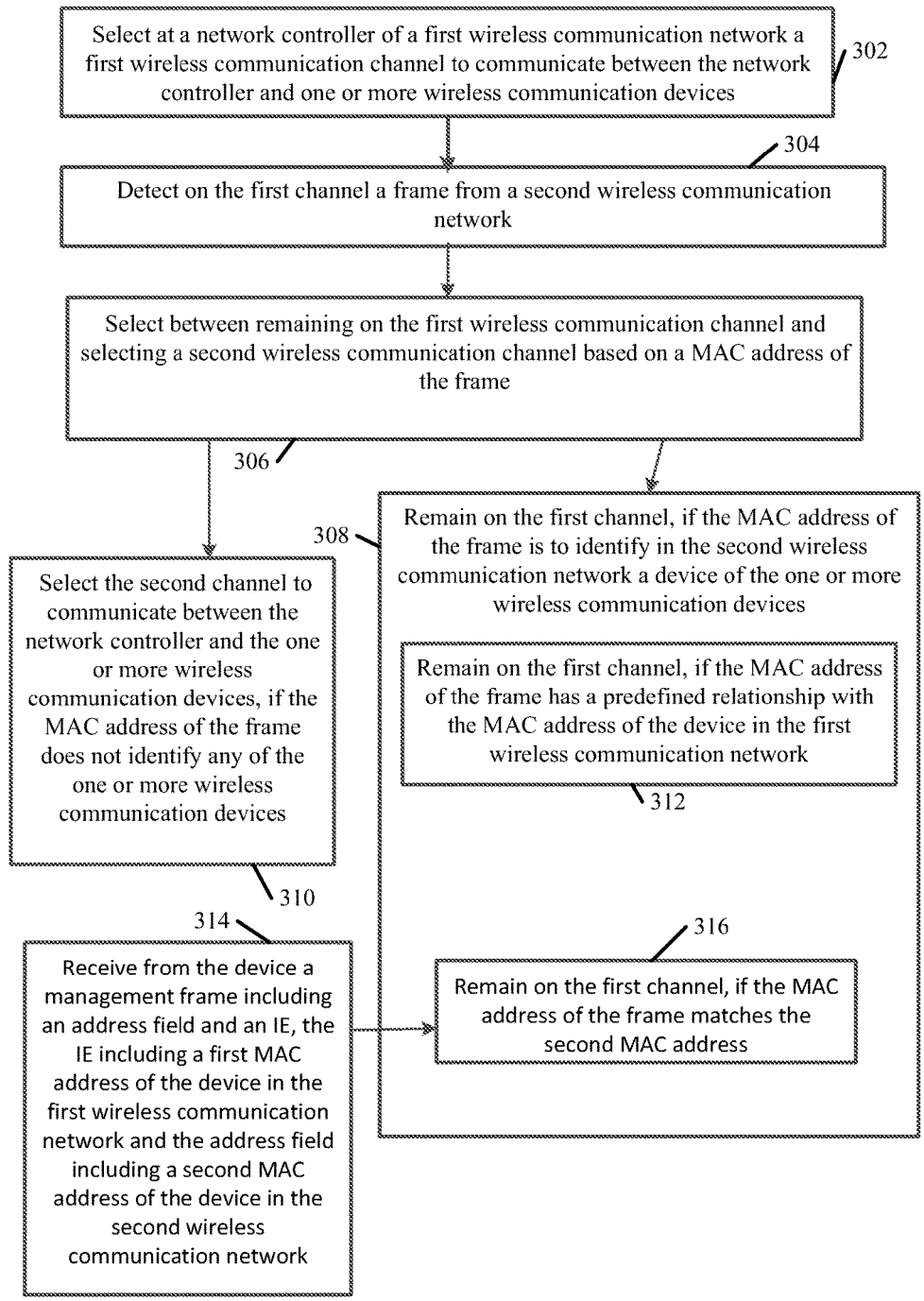
FIG. 3 is a schematic flow-chart illustration of a method of selecting a wireless communication channel, in accordance with some demonstrative embodiments.

Reference is made to FIG. 3, which schematically illustrates a method of selecting a wireless communication channel, in accordance with some demonstrative embodiments. In some demonstrative embodiments, one or more of the operations of the method of FIG. 3 may be performed by one or more elements of a system, e.g., system 100 (FIG. 1), a wireless communication device, e.g., wireless communication device 120 (FIG. 1), and/or a channel selector, e.g., channel selector 114 (FIG. 1).

As indicated at block 302, the method may include selecting at a network controller of a first wireless communication network a first wireless communication channel to communicate between the network controller and one or more wireless communication devices. For example, channel selector 114 (FIG. 1) may select the first wireless communication channel, e.g., as described above.

As indicated at block 304, the method may include detecting on the first wireless communication channel a frame from a second wireless communication network. For example, channel selector 114 (FIG. 1) may detect frame 177 (FIG. 1) from wireless communication network 105 (FIG. 1), e.g., as described above.

As indicated at block 306, the method may include, based on a MAC address of the frame, selecting between remaining on the first wireless communication channel and selecting a second wireless communication channel to communicate between the network controller and the one or more wireless communication devices. For example, channel selector 114 (FIG. 1) may select between remaining on the first wireless communication channel and selecting a second wireless communication channel, based on the MAC address of frame 177 (FIG. 1), e.g., as described above.

As indicated at block 308, the method may include, remaining on the first wireless communication channel, if the MAC address of the frame is to identify in the second wireless communication network a device of the one or more wireless communication devices of the first wireless communication network. For example, channel selector 114 (FIG. 1) may remain on the first wireless communication channel, if the MAC address of frame 177 (FIG. 1) identifies device 140 or device 160 (FIG. 1), e.g., as described above.

As indicated at block 312, the method may include remaining on the first wireless communication channel, if the MAC address of the frame has a predefined relationship with the MAC address of the device in the first wireless communication network. For example, channel selector 114 (FIG. 1) may remain on the first wireless communication channel, if the MAC address of frame 177 (FIG. 1) has a predefined relationship with MAC address 141 or 161 (FIG. 1), e.g., as described above.

As indicated at block 314, the method may include receiving from a device of the one or more wireless communication devices a management frame including an address field and an IE, the IE including a first MAC address of the device in the first wireless communication network, and the address field including a second MAC address of the device in the second wireless communication network. For example, device 120 (FIG. 1) may receive the management frame from device 140 or device 160 (FIG. 1), e.g., as described above.

As indicated at block 316, the method may include remaining on the first wireless communication channel, if the MAC address of the frame matches the second MAC address. For example, device 120 (FIG. 1) may remain on the first wireless communication channel, if the MAC address of frame 177 (FIG. 1) matches MAC address 145 or MAC address 165 (FIG. 1), e.g., as described above.

As indicated at block 310, the method may include selecting the second wireless communication channel to communicate between the network controller and the one or more wireless communication devices, if the MAC address of the frame does not identify any of the one or more wireless communication devices. For example, channel selector 114 (FIG. 1) may select the second wireless communication channel remain on the first wireless communication channel, if the MAC address of frame 177 (FIG. 1) does not identify device 140 or device 160 (FIG. 1), e.g., as described above.

Figure 4:
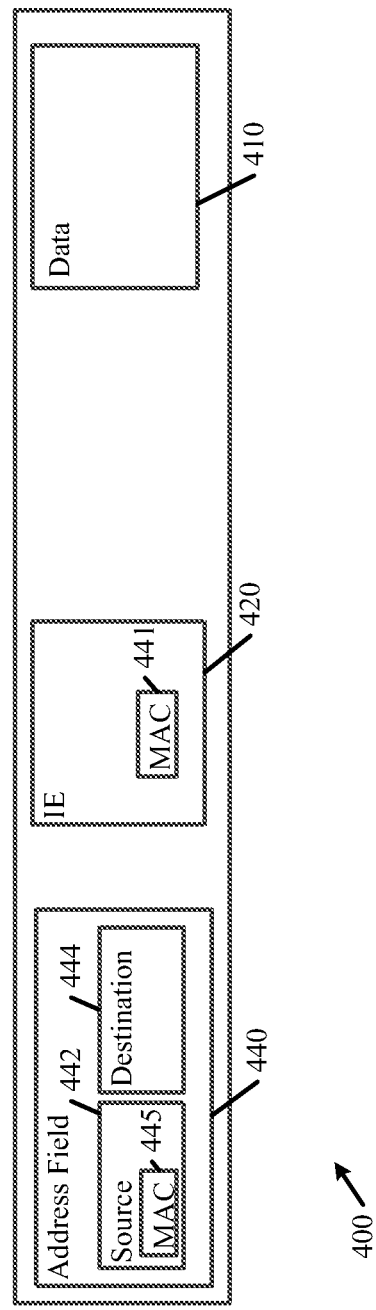
FIG. 4 is a schematic illustration of a frame, in accordance with some demonstrative embodiments.

Reference is made to FIG. 4, which schematically illustrates a frame 400, in accordance with some demonstrative embodiments.

In some demonstrative embodiments, frame 400 may include a P2P frame to be transmitted by a P2P device, e.g., a P2P GO or a P2P client, in a P2P wireless network.

In some demonstrative embodiments, frame 400 may include a beacon frame. For example, device 140 (FIG. 1) may transmit a beacon including frame 400 in wireless communication network 105 (FIG. 1).

In some demonstrative embodiments, frame 400 may include a probe response, For example, device 160 (FIG. 1) may transmit to device 120 (FIG. 1) a probe response including frame 400, in response to a probe request from device 120 (FIG. 1).

In some demonstrative embodiments, frame 400 may include an address field 440 including a source address 442 and a destination address 444.

In some demonstrative embodiments, source address 442 may include a MAC address 445 of the P2P device. For example, MAC address 445 may include MAC address 145 (FIG. 1), for example, if device 140 (FIG. 1) transmits frame 400 in wireless communication network 105 (FIG. 1).

In some demonstrative embodiments, frame 400 may include an information element (IE) 420 including a MAC address 441 of the P2P device to communicate with an AP. For example, MAC address 441 may include MAC address 141 (FIG. 1), for example, if device 140 (FIG. 1) transmits frame 400.

As shown in FIG. 4, frame 400 may include one or more additional fields. For example, frame 400 may include a data filed 410 including a payload and/or control information.

Figure 5:
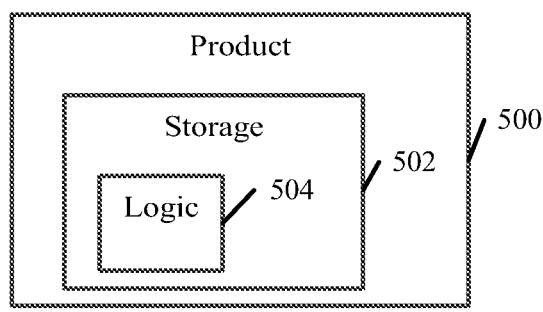
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 120 (FIG. 1), device 140 (FIG. 1), device 160 (FIG. 1), wireless communication unit 122 (FIG. 1), wireless communication unit 142 (FIG. 1), wireless communication unit 162 (FIG. 1), channel selector 114 (FIG. 1), and/or to perform one or more operations of the method of FIGS. 2 and/or 3. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes apparatus comprising a channel selector to select at a network controller of a first wireless communication network a first wireless communication channel to communicate between the network controller and one or more wireless communication devices, to detect on the first wireless communication channel a frame from a second wireless communication network, and based on a medium access control (MAC) address of the frame, to select between remaining on the first wireless communication channel and selecting a second wireless communication channel to communicate between the network controller and the one or more wireless communication devices.

Example 2 includes the subject matter of Example 1, and optionally, wherein the channel selector is to select to remain on the first wireless communication channel, if the MAC address of the frame is to identify in the second wireless communication network a device of the one or more wireless communication devices.

Example 3 includes the subject matter of Example 1 or 2, and optionally, wherein the channel selector is to select to remain on the first wireless communication channel, based on a comparison between the MAC address of the frame and a MAC address of a device of the one or more wireless communication devices.

Example 4 includes the subject matter of Example 3, and optionally, wherein the channel selector is to select to remain on the first wireless communication channel, if the MAC address of the frame has a predefined relationship with the MAC address of the device in the first wireless communication network.

Example 5 includes the subject matter of Example 3 or 4, and optionally, wherein the channel selector is to select to remain on the first wireless communication channel, if the MAC address of the frame and the MAC address of the device include immediately successive MAC addresses.

Example 6 includes the subject matter of any one of Examples 1-5, and optionally, wherein the channel selector is to select the second wireless communication channel to communicate between the network controller and the one or more wireless communication devices, if the MAC address of the frame does not identify any of the one or more wireless communication devices.

Example 7 includes the subject matter of any one of Examples 1-6, and optionally, wherein the channel selector is to receive a management frame from a device of the one or more devices, the management frame including an address field and an information element (IE), the IE including a first MAC address of the device in the first wireless communication network, the address field including a second MAC address of the device in the second wireless communication network.

Example 8 includes the subject matter of Example 7, and optionally, wherein the channel selector is to select to remain on the first wireless communication channel, if the MAC address of the frame from the second wireless communication network matches the second MAC address.

Example 9 includes the subject matter of Example 7 or 8, and optionally, wherein the management frame comprises a beacon from the device.

Example 10 includes the subject matter of Example 7 or 8, and optionally, wherein the management frame comprises a probe response from the device.

Example 11 includes the subject matter of Example 10, and optionally, wherein the probe response is in response to a probe request from the network controller to the device.

Example 12 includes the subject matter of any one of Examples 1-11, and optionally, wherein the channel selector is to select the second wireless communication channel according to an automatic channel selection mechanism.

Example 13 includes the subject matter of Example 12, and optionally, wherein the channel selector is to remain on the first wireless communication channel by disabling the automatic channel selection mechanism.

Example 14 includes the subject matter of any one of Examples 1-13, and optionally, wherein the frame includes a peer to peer (P2P) frame, and wherein a P2P information element of the frame includes the MAC address of the frame.

Example 15 includes the subject matter of any one of Examples 1-14, and optionally, wherein the first wireless communication network comprises a Wireless Fidelity (WiFi) communication network.

Example 16 includes the subject matter of any one of Examples 1-15, and optionally, wherein the second wireless communication network comprises a peer to peer (P2P) communication network.

Example 17 includes the subject matter of any one of Examples 1-16, and optionally, wherein the network controller comprises an access point (AP).

Example 18 includes an apparatus comprising a channel selector to select at a network controller of a first wireless communication network a first wireless communication channel to communicate between the network controller and one or more wireless communication devices, to detect on the first wireless communication channel a frame from a second wireless communication network, and to remain on the first wireless communication channel, if the frame is from a device of the one or more wireless communication devices, and to select a second wireless communication channel to communicate between the network controller and the one or more wireless communication devices, if the frame is not from any of the one or more wireless communication devices.

Example 19 includes the subject matter of Example 18, and optionally, wherein the channel selector is to select between remaining on the first wireless communication channel and selecting the second wireless communication channel, based on a medium access control (MAC) address of the frame.

Example 20 includes the subject matter of Example 19, and optionally, wherein the channel selector is to select to remain on the first wireless communication channel, if the MAC address of the frame is to identify the device in the second wireless communication network.

Example 21 includes the subject matter of Example 19 or 20, and optionally, wherein the channel selector is to select to remain on the first wireless communication channel, based on a comparison between the MAC address of the frame and a MAC address of the device in the first wireless communication network.

Example 22 includes the subject matter of Example 21, and optionally, wherein the channel selector is to select to remain on the first wireless communication channel, if the MAC address of the frame has a predefined relationship with the MAC address of the device in the first wireless communication network.

Example 23 includes the subject matter of Example 21 or 22, and optionally, wherein the channel selector is to select to remain on the first wireless communication channel, if the MAC address of the frame and the MAC address of the device include immediately successive MAC addresses.

Example 24 includes the subject matter of any one of Examples 19-23, and optionally, wherein the channel selector is to select the second wireless communication channel, to communicate between the network controller and the one or more wireless communication devices, if the MAC address of the frame does not identify any device of the one or more wireless communication devices.

Example 25 includes the subject matter of any one of Examples 18-24, and optionally, wherein the channel selector is to receive a management frame from a device of the one or more devices, the management frame including an address field and an information element (IE), the IE including a first medium access control (MAC) address of the device in the first wireless communication network, the address field including a second MAC address of the device in the second wireless communication network.

Example 26 includes the subject matter of Example 25, and optionally, wherein the channel selector is to select to remain on the first wireless communication channel, if a MAC address of the frame from the second wireless communication network matches the second MAC address.

Example 27 includes the subject matter of Example 25 or 26, and optionally, wherein the management frame comprises a beacon from the device.

Example 28 includes the subject matter of Example 25 or 26, and optionally, wherein the management frame comprises a probe response from the device.

Example 29 includes the subject matter of Example 28, and optionally, wherein the probe response is in response to a probe request from the network controller to the device.

Example 30 includes the subject matter of any one of Examples 18-29, and optionally, wherein the channel selector is to select the second wireless communication channel according to an automatic channel selection mechanism.

Example 31 includes the subject matter of Example 30, and optionally, wherein the channel selector is to remain on the first wireless communication channel by disabling the automatic channel selection mechanism.

Example 32 includes the subject matter of any one of Examples 18-31, and optionally, wherein the frame includes a peer to peer (P2P) frame, and wherein a P2P information element of the frame includes a MAC address of the frame.

Example 33 includes the subject matter of any one of Examples 18-32, and optionally, wherein the first wireless communication network comprises a Wireless Fidelity (WiFi) communication network.

Example 34 includes the subject matter of any one of Examples 18-33, and optionally, wherein the second wireless communication network comprises a peer to peer (P2P) communication network.

Example 35 includes the subject matter of any one of Examples 18-34, and optionally, wherein the network controller comprises an access point (AP).

Example 36 includes an apparatus comprising a wireless communication unit to communicate in a first wireless communication network and a second wireless communication network, the wireless communication unit to transmit in the second wireless communication network a frame including an address field and an information element (IE), the IE including a first medium access control (MAC) address of the wireless communication unit in the first wireless communication network, and the address field including a second MAC address of the wireless communication unit in the second wireless communication network.

Example 37 includes the subject matter of Example 36, and optionally, wherein the frame includes a peer to peer (P2P) beacon.

Example 38 includes the subject matter of Example 36, and optionally, wherein the frame includes a peer to peer (P2P) probe response in response to a probe request from a network controller of the first wireless communication network.

Example 39 includes the subject matter of any one of Examples 36-38, and optionally, wherein the first wireless communication network comprises a Wireless Fidelity (WiFi) communication network.

Example 40 includes the subject matter of any one of Examples 36-39, and optionally, wherein the second wireless communication network comprises a Wireless Fidelity (WiFi) direct network.

Example 41 includes the subject matter of any one of Examples 36-40, and optionally, wherein the second wireless communication network comprises a peer to peer (P2P) communication network.

Example 42 includes a network controller of a first wireless communication network, the network controller comprising at least one antenna; a memory; a processor; a radio; and a channel selector to select at the network controller a first wireless communication channel to communicate between the network controller and one or more wireless communication devices, to detect on the first wireless communication channel a frame from a second wireless communication network, and based on a medium access control (MAC) address of the frame, to select between remaining on the first wireless communication channel and selecting a second wireless communication channel to communicate between the network controller and the one or more wireless communication devices.

Example 43 includes the subject matter of Example 42, and optionally, wherein the channel selector is to select to remain on the first wireless communication channel, if the MAC address of the frame is to identify in the second wireless communication network a device of the one or more wireless communication devices.

Example 44 includes the subject matter of Example 42 or 43, and optionally, wherein the channel selector is to select to remain on the first wireless communication channel, based on a comparison between the MAC address of the frame and a MAC address of a device of the one or more wireless communication devices.

Example 45 includes the subject matter of Example 44, and optionally, wherein the channel selector is to select to remain on the first wireless communication channel, if the MAC address of the frame has a predefined relationship with the MAC address of the device in the first wireless communication network.

Example 46 includes the subject matter of Example 44 or 45, and optionally, wherein the channel selector is to select to remain on the first wireless communication channel, if the MAC address of the frame and the MAC address of the device include immediately successive MAC addresses.

Example 47 includes the subject matter of any one of Examples 42-46, and optionally, wherein the channel selector is to select the second wireless communication channel to communicate between the network controller and the one or more wireless communication devices, if the MAC address of the frame does not identify any of the one or more wireless communication devices.

Example 48 includes the subject matter of any one of Examples 42-47, and optionally, wherein the channel selector is to receive a management frame from a device of the one or more devices, the management frame including an address field and an information element (IE), the IE including a first MAC address of the device in the first wireless communication network, the address field including a second MAC address of the device in the second wireless communication network.

Example 49 includes the subject matter of Example 48, and optionally, wherein the channel selector is to select to remain on the first wireless communication channel, if the MAC address of the frame from the second wireless communication network matches the second MAC address.

Example 50 includes the subject matter of Example 48 or 49, and optionally, wherein the management frame comprises a beacon from the device.

Example 51 includes the subject matter of Example 48 or 49, and optionally, wherein the management frame comprises a probe response from the device.

Example 52 includes the subject matter of Example 51, and optionally, wherein the probe response is in response to a probe request from the network controller to the device.

Example 53 includes the subject matter of any one of Examples 42-52, and optionally, wherein the channel selector is to select the second wireless communication channel according to an automatic channel selection mechanism.

Example 54 includes the subject matter of Example 53, and optionally, wherein the channel selector is to remain on the first wireless communication channel by disabling the automatic channel selection mechanism.

Example 55 includes the subject matter of any one of Examples 42-54, and optionally, wherein the frame includes a peer to peer (P2P) frame, and wherein a P2P information element of the frame includes the MAC address of the frame.

Example 56 includes the subject matter of any one of Example 42-55, and optionally, wherein the first wireless communication network comprises a Wireless Fidelity (WiFi) communication network.

Example 57 includes the subject matter of any one of Example 42-56, and optionally, wherein the second wireless communication network comprises a peer to peer (P2P) communication network.

Example 58 includes the subject matter of any one of Example 42-57, and optionally, wherein the network controller comprises an access point (AP).

Example 59 includes a network controller of a first wireless communication network, the network controller comprising at least one antenna; a memory; a processor; a radio; and a channel selector to select at the network controller a first wireless communication channel to communicate between the network controller and one or more wireless communication devices, to detect on the first wireless communication channel a frame from a second wireless communication network, and to remain on the first wireless communication channel, if the frame is from a device of the one or more wireless communication devices, and to select a second wireless communication channel to communicate between the network controller and the one or more wireless communication devices, if the frame is not from any of the one or more wireless communication devices.

Example 60 includes the subject matter of Example 59, and optionally, wherein the channel selector is to select between remaining on the first wireless communication channel and selecting the second wireless communication channel, based on a medium access control (MAC) address of the frame.

Example 61 includes the subject matter of Example 60, and optionally, wherein the channel selector is to select to remain on the first wireless communication channel, if the MAC address of the frame is to identify the device in the second wireless communication network.

Example 62 includes the subject matter of Example 60 or 61, and optionally, wherein the channel selector is to select to remain on the first wireless communication channel, based on a comparison between the MAC address of the frame and a MAC address of the device in the first wireless communication network.

Example 63 includes the subject matter of Example 62, and optionally, wherein the channel selector is to select to remain on the first wireless communication channel, if the MAC address of the frame has a predefined relationship with the MAC address of the device in the first wireless communication network.

Example 64 includes the subject matter of Example 62 or 63, and optionally, wherein the channel selector is to select to remain on the first wireless communication channel, if the MAC address of the frame and the MAC address of the device include immediately successive MAC addresses.

Example 65 includes the subject matter of any one of Examples 60-64, and optionally, wherein the channel selector is to select the second wireless communication channel, to communicate between the network controller and the one or more wireless communication devices, if the MAC address of the frame does not identify any device of the one or more wireless communication devices.

Example 66 includes the subject matter of any one of Examples 59-65, and optionally, wherein the channel selector is to receive a management frame from a device of the one or more devices, the management frame including an address field and an information element (IE), the IE including a first medium access control (MAC) address of the device in the first wireless communication network, the address field including a second MAC address of the device in the second wireless communication network.

Example 67 includes the subject matter of Example 66, and optionally, wherein the channel selector is to select to remain on the first wireless communication channel, if a MAC address of the frame from the second wireless communication network matches the second MAC address.

Example 68 includes the subject matter of Example 66 or 67, and optionally, wherein the management frame comprises a beacon from the device.

Example 69 includes the subject matter of Example 66 or 67, and optionally, wherein the management frame comprises a probe response from the device.

Example 70 includes the subject matter of Example 69, and optionally, wherein the probe response is in response to a probe request from the network controller to the device.

Example 71 includes the subject matter of any one of Examples 59-70, and optionally, wherein the channel selector is to select the second wireless communication channel according to an automatic channel selection mechanism.

Example 72 includes the subject matter of Example 71, and optionally, wherein the channel selector is to remain on the first wireless communication channel by disabling the automatic channel selection mechanism.

Example 73 includes the subject matter of any one of Examples 59-72, and optionally, wherein the frame includes a peer to peer (P2P) frame, and wherein a P2P information element of the frame includes a medium access control (MAC) address of the frame.

Example 74 includes the subject matter of any one of Examples 59-73, and optionally, wherein the first wireless communication network comprises a Wireless Fidelity (WiFi) communication network.

Example 75 includes the subject matter of any one of Examples 59-74, and optionally, wherein the second wireless communication network comprises a peer to peer (P2P) communication network.

Example 76 includes the subject matter of any one of Examples 59-75, and optionally, wherein the network controller comprises an access point (AP).

Example 77 includes a wireless communication device comprising at least one antenna; a memory; a processor; a radio; and a wireless communication unit to communicate in a first wireless communication network and a second wireless communication network, the wireless communication unit to transmit in the second wireless communication network a frame including an address field and an information element (IE), the IE including a first medium access control (MAC) address of the wireless communication device in the first wireless communication network, and the address field including a second MAC address of the wireless communication device in the second wireless communication network.

Example 78 includes the subject matter of Example 77, and optionally, wherein the frame includes a peer to peer (P2P) beacon.

Example 79 includes the subject matter of Example 77, and optionally, wherein the frame includes a peer to peer (P2P) probe response in response to a probe request from a network controller of the first wireless communication network.

Example 80 includes the subject matter of any one of Examples 77-79, and optionally, wherein the first wireless communication network comprises a Wireless Fidelity (WiFi) communication network.

Example 81 includes the subject matter of any one of Examples 77-80, and optionally, wherein the second wireless communication network comprises a Wireless Fidelity (WiFi) direct network.

Example 82 includes the subject matter of any one of Examples 77-81, and optionally, wherein the second wireless communication network comprises a peer to peer (P2P) communication network.

Example 83 includes a method comprising selecting at a network controller of a first wireless communication network a first wireless communication channel to communicate between the network controller and one or more wireless communication devices; detecting on the first wireless communication channel a frame from a second wireless communication network; and based on a medium access control (MAC) address of the frame, selecting between remaining on the first wireless communication channel and selecting a second wireless communication channel to communicate between the network controller and the one or more wireless communication devices.

Example 84 includes the subject matter of Example 83, and optionally, comprising remaining on the first wireless communication channel, if the MAC address of the frame is to identify in the second wireless communication network a device of the one or more wireless communication devices.

Example 85 includes the subject matter of Example 83 or 84, and optionally, comprising remaining on the first wireless communication channel, based on a comparison between the MAC address of the frame and a MAC address of a device of the one or more wireless communication devices.

Example 86 includes the subject matter of Example 85, and optionally, comprising remaining on the first wireless communication channel, if the MAC address of the frame has a predefined relationship with the MAC address of the device in the first wireless communication network.

Example 87 includes the subject matter of Example 85 or 86, and optionally, comprising remaining on the first wireless communication channel, if the MAC address of the frame and the MAC address of the device include immediately successive MAC addresses.

Example 88 includes the subject matter of any one of Examples 83-87, and optionally, comprising selecting the second wireless communication channel to communicate between the network controller and the one or more wireless communication devices, if the MAC address of the frame does not identify any of the one or more wireless communication devices.

Example 89 includes the subject matter of any one of Examples 83-88, and optionally, comprising receiving a management frame from a device of the one or more devices, the management frame including an address field and an information element (IE), the IE including a first MAC address of the device in the first wireless communication network, the address field including a second MAC address of the device in the second wireless communication network.

Example 90 includes the subject matter of Example 89, and optionally, comprising remaining on the first wireless communication channel, if the MAC address of the frame from the second wireless communication network matches the second MAC address.

Example 91 includes the subject matter of Example 89 or 90, and optionally, wherein the management frame comprises a beacon from the device.

Example 92 includes the subject matter of Example 89 or 90, and optionally, wherein the management frame comprises a probe response from the device.

Example 93 includes the subject matter of Example 92, and optionally, wherein the probe response is in response to a probe request from the network controller to the device.

Example 94 includes the subject matter of any one of Examples 83-93, and optionally, comprising selecting the second wireless communication channel according to an automatic channel selection mechanism.

Example 95 includes the subject matter of Example 94, and optionally, comprising remaining on the first wireless communication channel by disabling the automatic channel selection mechanism.

Example 96 includes the subject matter of any one of Examples 83-95, and optionally, wherein the frame includes a peer to peer (P2P) frame, and wherein a P2P information element of the frame includes the MAC address of the frame.

Example 97 includes the subject matter of any one of Examples 83-96, and optionally, wherein the first wireless communication network comprises a Wireless Fidelity (WiFi) communication network.

Example 98 includes the subject matter of any one of Examples 83-97, and optionally, wherein the second wireless communication network comprises a peer to peer (P2P) communication network.

Example 99 includes the subject matter of any one of Examples 83-98, and optionally, wherein the network controller comprises an access point (AP).

Example 100 includes a method comprising selecting at a network controller of a first wireless communication network a first wireless communication channel to communicate between the network controller and one or more wireless communication devices; detecting on the first wireless communication channel a frame from a second wireless communication network; remaining on the first wireless communication channel, if the frame is from a device of the one or more wireless communication devices; and selecting a second wireless communication channel to communicate between the network controller and the one or more wireless communication devices, if the frame is not from any of the one or more wireless communication devices.

Example 101 includes the subject matter of Example 100, and optionally, comprising selecting between remaining on the first wireless communication channel and selecting the second wireless communication channel, based on a medium access control (MAC) address of the frame.

Example 102 includes the subject matter of Example 101, and optionally, comprising remaining on the first wireless communication channel, if the MAC address of the frame is to identify the device in the second wireless communication network.

Example 103 includes the subject matter of Example 101 or 102, and optionally, comprising remaining on the first wireless communication channel, based on a comparison between the MAC address of the frame and a MAC address of the device in the first wireless communication network.

Example 104 includes the subject matter of Example 103, and optionally, comprising remaining on the first wireless communication channel, if the MAC address of the frame has a predefined relationship with the MAC address of the device in the first wireless communication network.

Example 105 includes the subject matter of Example 103 or 104, and optionally, comprising remaining on the first wireless communication channel, if the MAC address of the frame and the MAC address of the device include immediately successive MAC addresses.

Example 106 includes the subject matter of any one of Examples 101-105, and optionally, comprising selecting the second wireless communication channel, to communicate between the network controller and the one or more wireless communication devices, if the MAC address of the frame does not identify any device of the one or more wireless communication devices.

Example 107 includes the subject matter of any one of Examples 100-106, and optionally, comprising receiving a management frame from a device of the one or more devices, the management frame including an address field and an information element (IE), the IE including a first medium access control (MAC) address of the device in the first wireless communication network, the address field including a second MAC address of the device in the second wireless communication network.

Example 108 includes the subject matter of Example 107, and optionally, comprising remaining on the first wireless communication channel, if a MAC address of the frame from the second wireless communication network matches the second MAC address.

Example 109 includes the subject matter of Example 107 or 108, and optionally, wherein the management frame comprises a beacon from the device.

Example 110 includes the subject matter of Example 107 or 108, and optionally, wherein the management frame comprises a probe response from the device.

Example 111 includes the subject matter of Example 110, and optionally, wherein the probe response is in response to a probe request from the network controller to the device.

Example 112 includes the subject matter of any one of Examples 100-111, and optionally, comprising selecting the second wireless communication channel according to an automatic channel selection mechanism.

Example 113 includes the subject matter of Example 112, and optionally, comprising remaining on the first wireless communication channel by disabling the automatic channel selection mechanism.

Example 114 includes the subject matter of any one of Examples 100-113, and optionally, wherein the frame includes a peer to peer (P2P) frame, and wherein a P2P information element of the frame includes a medium access control (MAC) address of the frame.

Example 115 includes the subject matter of any one of Examples 100-114, and optionally, wherein the first wireless communication network comprises a Wireless Fidelity (WiFi) communication network.

Example 116 includes the subject matter of any one of Examples 100-115, and optionally, wherein the second wireless communication network comprises a peer to peer (P2P) communication network.

Example 117 includes the subject matter of any one of Examples 100-116, and optionally, wherein the network controller comprises an access point (AP).

Example 118 includes a method performed by a device communicating in a first wireless communication network and a second wireless communication network, the method comprising transmitting in the second wireless communication network a frame including an address field and an information element (IE), the IE including a first medium access control (MAC) address of the device in the first wireless communication network, and the address field including a second MAC address of the device in the second wireless communication network.

Example 119 includes the subject matter of Example 118, and optionally, wherein the frame includes a peer to peer (P2P) beacon.

Example 120 includes the subject matter of Example 118, and optionally, wherein the frame includes a peer to peer (P2P) probe response in response to a probe request from a network controller of the first wireless communication network.

Example 121 includes the subject matter of any one of Examples 118-120, and optionally, wherein the first wireless communication network comprises a Wireless Fidelity (WiFi) communication network.

Example 122 includes the subject matter of any one of Examples 118-121, and optionally, wherein the second wireless communication network comprises a Wireless Fidelity (WiFi) direct network.

Example 123 includes the subject matter of any one of Examples 118-122, and optionally, wherein the second wireless communication network comprises a peer to peer (P2P) communication network.

Example 124 includes a product including a non-transitory storage medium having stored thereon instructions that, when executed by a machine, result in selecting at a network controller of a first wireless communication network a first wireless communication channel to communicate between the network controller and one or more wireless communication devices; detecting on the first wireless communication channel a frame from a second wireless communication network; and based on a medium access control (MAC) address of the frame, selecting between remaining on the first wireless communication channel and selecting a second wireless communication channel to communicate between the network controller and the one or more wireless communication devices.

Example 125 includes the subject matter of Example 124, and optionally, wherein the instructions result in remaining on the first wireless communication channel, if the MAC address of the frame is to identify in the second wireless communication network a device of the one or more wireless communication devices.

Example 126 includes the subject matter of Example 124 or 125, and optionally, wherein the instructions result in remaining on the first wireless communication channel, based on a comparison between the MAC address of the frame and a MAC address of a device of the one or more wireless communication devices.

Example 127 includes the subject matter of Example 126, and optionally, wherein the instructions result in remaining on the first wireless communication channel, if the MAC address of the frame has a predefined relationship with the MAC address of the device in the first wireless communication network.

Example 128 includes the subject matter of Example 126 or 127, and optionally, wherein the instructions result in remaining on the first wireless communication channel, if the MAC address of the frame and the MAC address of the device include immediately successive MAC addresses.

Example 129 includes the subject matter of any one of Examples 124-128, and optionally, wherein the instructions result in selecting the second wireless communication channel to communicate between the network controller and the one or more wireless communication devices, if the MAC address of the frame does not identify any of the one or more wireless communication devices.

Example 130 includes the subject matter of any one of Examples 124-129, and optionally, wherein the instructions result in receiving a management frame from a device of the one or more devices, the management frame including an address field and an information element (IE), the IE including a first MAC address of the device in the first wireless communication network, the address field including a second MAC address of the device in the second wireless communication network.

Example 131 includes the subject matter of Example 130, and optionally, wherein the instructions result in remaining on the first wireless communication channel, if the MAC address of the frame from the second wireless communication network matches the second MAC address.

Example 132 includes the subject matter of Example 130 or 131, and optionally, wherein the management frame comprises a beacon from the device.

Example 133 includes the subject matter of Example 130 or 131, and optionally, wherein the management frame comprises a probe response from the device.

Example 134 includes the subject matter of Example 133, and optionally, wherein the probe response is in response to a probe request from the network controller to the device.

Example 135 includes the subject matter of any one of Examples 124-134, and optionally, wherein the instructions result in selecting the second wireless communication channel according to an automatic channel selection mechanism.

Example 136 includes the subject matter of Example 135, and optionally, wherein the instructions result in remaining on the first wireless communication channel by disabling the automatic channel selection mechanism.

Example 137 includes the subject matter of any one of Examples 124-136, and optionally, wherein the frame includes a peer to peer (P2P) frame, and wherein a P2P information element of the frame includes the MAC address of the frame.

Example 138 includes the subject matter of any one of Examples 124-137, and optionally, wherein the first wireless communication network comprises a Wireless Fidelity (WiFi) communication network.

Example 139 includes the subject matter of any one of Examples 124-138, and optionally, wherein the second wireless communication network comprises a peer to peer (P2P) communication network.

Example 140 includes the subject matter of any one of Examples 124-139, and optionally, wherein the network controller comprises an access point (AP).

Example 141 includes a product including a non-transitory storage medium having stored thereon instructions that, when executed by a machine, result in selecting at a network controller of a first wireless communication network a first wireless communication channel to communicate between the network controller and one or more wireless communication devices; detecting on the first wireless communication channel a frame from a second wireless communication network; remaining on the first wireless communication channel, if the frame is from a device of the one or more wireless communication devices; and selecting a second wireless communication channel to communicate between the network controller and the one or more wireless communication devices, if the frame is not from any of the one or more wireless communication devices.

Example 142 includes the subject matter of Example 141, and optionally, wherein the instructions result in selecting between remaining on the first wireless communication channel and selecting the second wireless communication channel, based on a medium access control (MAC) address of the frame.

Example 143 includes the subject matter of Example 142, and optionally, wherein the instructions result in remaining on the first wireless communication channel, if the MAC address of the frame is to identify the device in the second wireless communication network.

Example 144 includes the subject matter of Example 142 or 143, and optionally, wherein the instructions result in remaining on the first wireless communication channel, based on a comparison between the MAC address of the frame and a MAC address of the device in the first wireless communication network.

Example 145 includes the subject matter of Example 144, and optionally, wherein the instructions result in remaining on the first wireless communication channel, if the MAC address of the frame has a predefined relationship with the MAC address of the device in the first wireless communication network.

Example 146 includes the subject matter of Example 144 or 145, and optionally, wherein the instructions result in remaining on the first wireless communication channel, if the MAC address of the frame and the MAC address of the device include immediately successive MAC addresses.

Example 147 includes the subject matter of any one of Examples 142-146, and optionally, wherein the instructions result in selecting the second wireless communication channel, to communicate between the network controller and the one or more wireless communication devices, if the MAC address of the frame does not identify any device of the one or more wireless communication devices.

Example 148 includes the subject matter of any one of Examples 141-147, and optionally, wherein the instructions result in receiving a management frame from a device of the one or more devices, the management frame including an address field and an information element (IE), the IE including a first medium access control (MAC) address of the device in the first wireless communication network, the address field including a second MAC address of the device in the second wireless communication network.

Example 149 includes the subject matter of Example 148, and optionally, wherein the instructions result in remaining on the first wireless communication channel, if a MAC address of the frame from the second wireless communication network matches the second MAC address.

Example 150 includes the subject matter of Example 148 or 149, and optionally, wherein the management frame comprises a beacon from the device.

Example 151 includes the subject matter of Example 148 or 149, and optionally, wherein the management frame comprises a probe response from the device.

Example 152 includes the subject matter of Example 151, and optionally, wherein the probe response is in response to a probe request from the network controller to the device.

Example 153 includes the subject matter of any one of Examples 141-152, and optionally, wherein the instructions result in selecting the second wireless communication channel according to an automatic channel selection mechanism.

Example 154 includes the subject matter of Example 153, and optionally, comprising remaining on the first wireless communication channel by disabling the automatic channel selection mechanism.

Example 155 includes the subject matter of any one of Examples 141-154, and optionally, wherein the frame includes a peer to peer (P2P) frame, and wherein a P2P information element of the frame includes a medium access control (MAC) address of the frame.

Example 156 includes the subject matter of any one of Examples 141-155, and optionally, wherein the first wireless communication network comprises a Wireless Fidelity (WiFi) communication network.

Example 157 includes the subject matter of any one of Examples 141-156, and optionally, wherein the second wireless communication network comprises a peer to peer (P2P) communication network.

Example 158 includes the subject matter of any one of Examples 141-157, and optionally, wherein the network controller comprises an access point (AP).

Example 159 includes a product including a non-transitory storage medium having stored thereon instructions that, when executed by a machine, result in communicating in a first wireless communication network and in a second wireless communication network; and transmitting in the second wireless communication network a frame including an address field and an information element (IE), the IE including a first medium access control (MAC) address of a device in the first wireless communication network, and the address field including a second MAC address of the device in the second wireless communication network.

Example 160 includes the subject matter of Example 159, and optionally, wherein the frame includes a peer to peer (P2P) beacon.

Example 161 includes the subject matter of Example 159, and optionally, wherein the frame includes a peer to peer (P2P) probe response in response to a probe request from a network controller of the first wireless communication network.

Example 162 includes the subject matter of any one of Examples 159-161, and optionally, wherein the first wireless communication network comprises a Wireless Fidelity (WiFi) communication network.

Example 163 includes the subject matter of any one of Examples 159-162, and optionally, wherein the second wireless communication network comprises a Wireless Fidelity (WiFi) direct network.

Example 164 includes the subject matter of any one of Examples 159-163, and optionally, wherein the second wireless communication network comprises a peer to peer (P2P) communication network.

Example 165 includes an apparatus comprising means for selecting at a network controller of a first wireless communication network a first wireless communication channel to communicate between the network controller and one or more wireless communication devices; means for detecting on the first wireless communication channel a frame from a second wireless communication network; and means for based on a medium access control (MAC) address of the frame, selecting between remaining on the first wireless communication channel and selecting a second wireless communication channel to communicate between the network controller and the one or more wireless communication devices.

Example 166 includes the subject matter of Example 124, and optionally, comprising means for remaining on the first wireless communication channel, if the MAC address of the frame is to identify in the second wireless communication network a device of the one or more wireless communication devices.

Example 167 includes the subject matter of Example 165 or 166, and optionally, comprising means for remaining on the first wireless communication channel, based on a comparison between the MAC address of the frame and a MAC address of a device of the one or more wireless communication devices.

Example 168 includes the subject matter of Example 167, and optionally, comprising means for remaining on the first wireless communication channel, if the MAC address of the frame has a predefined relationship with the MAC address of the device in the first wireless communication network.

Example 169 includes the subject matter of Example 167 or 168, and optionally, comprising means for remaining on the first wireless communication channel, if the MAC address of the frame and the MAC address of the device include immediately successive MAC addresses.

Example 170 includes the subject matter of any one of Examples 165-169, and optionally, comprising means for selecting the second wireless communication channel to communicate between the network controller and the one or more wireless communication devices, if the MAC address of the frame does not identify any of the one or more wireless communication devices.

Example 171 includes the subject matter of any one of Examples 165-170, and optionally, comprising means for receiving a management frame from a device of the one or more devices, the management frame including an address field and an information element (IE), the IE including a first MAC address of the device in the first wireless communication network, the address field including a second MAC address of the device in the second wireless communication network.

Example 172 includes the subject matter of Example 171, and optionally, comprising means for remaining on the first wireless communication channel, if the MAC address of the frame from the second wireless communication network matches the second MAC address.

Example 173 includes the subject matter of Example 171 or 172, and optionally, wherein the management frame comprises a beacon from the device.

Example 174 includes the subject matter of Example 171 or 172, and optionally, wherein the management frame comprises a probe response from the device.

Example 175 includes the subject matter of Example 174, and optionally, wherein the probe response is in response to a probe request from the network controller to the device.

Example 176 includes the subject matter of any one of Examples 165-175, and optionally, comprising means for selecting the second wireless communication channel according to an automatic channel selection mechanism.

Example 177 includes the subject matter of Example 176, and optionally, comprising means for remaining on the first wireless communication channel by disabling the automatic channel selection mechanism.

Example 178 includes the subject matter of any one of Examples 165-177, and optionally, wherein the frame includes a peer to peer (P2P) frame, and wherein a P2P information element of the frame includes the MAC address of the frame.

Example 179 includes the subject matter of any one of Examples 165-178, and optionally, wherein the first wireless communication network comprises a Wireless Fidelity (WiFi) communication network.

Example 180 includes the subject matter of any one of Examples 165-179, and optionally, wherein the second wireless communication network comprises a peer to peer (P2P) communication network.

Example 181 includes the subject matter of any one of Examples 165-180, and optionally, wherein the network controller comprises an access point (AP).

Example 182 includes an apparatus comprising means for selecting at a network controller of a first wireless communication network a first wireless communication channel to communicate between the network controller and one or more wireless communication devices; means for detecting on the first wireless communication channel a frame from a second wireless communication network; and means for remaining on the first wireless communication channel, if the frame is from a device of the one or more wireless communication devices, and selecting a second wireless communication channel to communicate between the network controller and the one or more wireless communication devices, if the frame is not from any of the one or more wireless communication devices.

Example 183 includes the subject matter of Example 182, and optionally, comprising means for selecting between remaining on the first wireless communication channel and selecting the second wireless communication channel, based on a medium access control (MAC) address of the frame.

Example 184 includes the subject matter of Example 183, and optionally, comprising means for remaining on the first wireless communication channel, if the MAC address of the frame is to identify the device in the second wireless communication network.

Example 185 includes the subject matter of Example 183 or 184, and optionally, comprising means for remaining on the first wireless communication channel, based on a comparison between the MAC address of the frame and a MAC address of the device in the first wireless communication network.

Example 186 includes the subject matter of Example 184 or 185, and optionally, comprising means for remaining on the first wireless communication channel, if the MAC address of the frame has a predefined relationship with the MAC address of the device in the first wireless communication network.

Example 187 includes the subject matter of Example 186, and optionally, comprising means for remaining on the first wireless communication channel, if the MAC address of the frame and the MAC address of the device include immediately successive MAC addresses.

Example 188 includes the subject matter of any one of Examples 183-187, and optionally, comprising means for selecting the second wireless communication channel, to communicate between the network controller and the one or more wireless communication devices, if the MAC address of the frame does not identify any device of the one or more wireless communication devices.

Example 189 includes the subject matter of any one of Examples 182-188, and optionally, comprising means for receiving a management frame from a device of the one or more devices, the management frame including an address field and an information element (IE), the IE including a first medium access control (MAC) address of the device in the first wireless communication network, the address field including a second MAC address of the device in the second wireless communication network.

Example 190 includes the subject matter of Example 189, and optionally, comprising means for remaining on the first wireless communication channel, if a MAC address of the frame from the second wireless communication network matches the second MAC address.

Example 191 includes the subject matter of Example 189 or 190, and optionally, wherein the management frame comprises a beacon from the device.

Example 192 includes the subject matter of Example 189 or 190, and optionally, wherein the management frame comprises a probe response from the device.

Example 193 includes the subject matter of Example 192, and optionally, wherein the probe response is in response to a probe request from the network controller to the device.

Example 194 includes the subject matter of any one of Examples 182-193, and optionally, comprising means for selecting the second wireless communication channel according to an automatic channel selection mechanism.

Example 195 includes the subject matter of Example 194, and optionally, comprising remaining on the first wireless communication channel by disabling the automatic channel selection mechanism.

Example 196 includes the subject matter of any one of Examples 182-195, and optionally, wherein the frame includes a peer to peer (P2P) frame, and wherein a P2P information element of the frame includes a medium access control (MAC) address of the frame.

Example 197 includes the subject matter of any one of Examples 182-196, and optionally, wherein the first wireless communication network comprises a Wireless Fidelity (WiFi) communication network.

Example 198 includes the subject matter of any one of Examples 182-197, and optionally, wherein the second wireless communication network comprises a peer to peer (P2P) communication network.

Example 199 includes the subject matter of any one of Examples 182-198, and optionally, wherein the network controller comprises an access point (AP).

Example 200 includes an apparatus comprising means for communicating in a first wireless communication network and in a second wireless communication network; and means for transmitting in the second wireless communication network a frame including an address field and an information element (IE), the IE including a first medium access control (MAC) address of a device in the first wireless communication network, and the address field including a second MAC address of the device in the second wireless communication network.

Example 201 includes the subject matter of Example 200, and optionally, wherein the frame includes a peer to peer (P2P) beacon.

Example 202 includes the subject matter of Example 200, and optionally, wherein the frame includes a peer to peer (P2P) probe response in response to a probe request from a network controller of the first wireless communication network.

Example 203 includes the subject matter of any one of Examples 200-202, and optionally, wherein the first wireless communication network comprises a Wireless Fidelity (WiFi) communication network.

Example 204 includes the subject matter of any one of Examples 200-203, and optionally, wherein the second wireless communication network comprises a Wireless Fidelity (WiFi) direct network.

Example 205 includes the subject matter of any one of Examples 200-204, and optionally, wherein the second wireless communication network comprises a peer to peer (P2P) communication network.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    a channel selector to select at a network controller of a first wireless communication network a first wireless communication channel to communicate between said network controller and one or more wireless communication devices, to detect on said first wireless communication channel a frame from a second wireless communication network, to make a determination on whether or not a medium access control (MAC) address of said frame is to identify in said second wireless communication network a device of said one or more wireless communication devices of said first wireless communication network, and, based on the determination, to select between remaining on said first wireless communication channel and determining a second wireless communication channel to communicate between said network controller and said one or more wireless communication devices, said channel selector is configured to, when the MAC address of the frame is determined to identify the device in said second wireless communication network, select to remain on said first wireless communication channel to communicate between said network controller and said one or more wireless communication devices, wherein said channel selector is to select to remain on said first wireless communication channel, if the MAC address of the frame has a predefined relationship with a MAC address of the device in said first wireless communication network.

2. The apparatus of claim 1, wherein said network controller comprises an access point (AP).

3. The apparatus of claim 1, wherein said channel selector is to select to remain on said first wireless communication channel, based on a comparison between the MAC address of the frame and the MAC address of the device in said first wireless communication network.

4. The apparatus of claim 1, wherein said channel selector is to select to remain on said first wireless communication channel, if the MAC address of the frame and the MAC address of the device include immediately successive MAC addresses.

5. The apparatus of claim 1, wherein said channel selector is to determine the second wireless communication channel to communicate between said network controller and said one or more wireless communication devices, if the MAC address of the frame does not identify any of said one or more wireless communication devices.

6. The apparatus of claim 1, wherein said channel selector is to receive a management frame from the device of said one or more wireless communication devices, said management frame including an address field and an information element (IE), said IE including a first MAC address of said device in said first wireless communication network, said address field including a second MAC address of said device in said second wireless communication network.

7. The apparatus of claim 6, wherein said channel selector is to select to remain on said first wireless communication channel, if the MAC address of the frame from said second wireless communication network matches the second MAC address.

8. The apparatus of claim 6, wherein said management frame comprises a beacon from said device.

9. The apparatus of claim 6, wherein said management frame comprises a probe response from said device.

10. The apparatus of claim 9, wherein said probe response is in response to a probe request from said network controller to said device.

11. The apparatus of claim 1, wherein said channel selector is to determine said second wireless communication channel according to an automatic channel selection mechanism.

12. The apparatus of claim 11, wherein said channel selector is to remain on said first wireless communication channel by disabling said automatic channel selection mechanism.

13. The apparatus of claim 1, wherein said frame includes a peer to peer (P2P) frame, and wherein a P2P information element of said frame includes the MAC address of the frame.

14. The apparatus of claim 1, wherein said first wireless communication network comprises a Wireless Fidelity (WiFi) communication network.

15. The apparatus of claim 1, wherein said second wireless communication network comprises a peer to peer (P2P) communication network.

16. The apparatus of claim 1 comprising an antenna, a radio, a memory, and a processor.

17. A network controller of a first wireless communication network, said network controller comprising:
at least one antenna;
a memory;
a processor;
a radio; and
a channel selector to select at said network controller a first wireless communication channel to communicate between said network controller and one or more wireless communication devices, to detect on said first wireless communication channel a frame from a second wireless communication network, and to determine whether or not said frame is from a device of said one or more wireless communication devices of said first wireless communication network, said channel selector is to remain on said first wireless communication channel to communicate between said network controller and said one or more wireless communication devices, when said frame is determined to be from the device of said one or more wireless communication devices, wherein said channel selector is to determine a second wireless communication channel to communicate between said network controller and said one or more wireless communication devices, when said frame is determined not to be from any of said one or more wireless communication devices, wherein said channel selector is to select to remain on said first wireless communication channel, if a medium access control (MAC) address of the frame has a predefined relationship with a MAC address of the device in said first wireless communication network.

18. The network controller of claim 17, wherein said channel selector is to remain on said first wireless communication channel by disabling an automatic channel selection mechanism.

19. A method comprising:
selecting at a network controller of a first wireless communication network a first wireless communication channel to communicate between said network controller and one or more wireless communication devices;
detecting on said first wireless communication channel a frame from a second wireless communication network;
making a determination on whether or not a medium access control (MAC) address of said frame is to identify in said second wireless communication network a device of said one or more wireless communication devices of said first wireless communication network; and
based on the determination, selecting between remaining on said first wireless communication channel and determining a second wireless communication channel to communicate between said network controller and said one or more wireless communication devices, wherein selecting between remaining on said first wireless communication channel and determining the second wireless communication channel comprises, when the MAC address of the frame is determined to identify the device in said second wireless communication network, selecting to remain on said first wireless communication channel to communicate between said network controller and said one or more wireless communication devices, wherein selecting between remaining on said first wireless communication channel and determining the second wireless communication channel comprises selecting to remain on said first wireless communication channel, when the MAC address of the frame has a predefined relationship with a MAC address of the device in said first wireless communication network.

20. The method of claim 19 comprising remaining on said first wireless communication channel, based on a comparison between the MAC address of the frame and the MAC address of the device.

21. The method of claim 19 comprising selecting the second wireless communication channel to communicate between said network controller and said one or more wireless communication devices, if the MAC address of the frame does not identify any of said one or more wireless communication devices.

* * * * *